US012605867B2

(12) United States Patent
Kemmerling

(10) Patent No.: US 12,605,867 B2
(45) Date of Patent: Apr. 21, 2026

(54) METHOD FOR PRODUCING A STRUCTURING AGENT FOR TEXTURING AN EMBOSSABLE MATERIAL SURFACE, IN PARTICULAR A RESIN-CONTAINING LAMINATE SURFACE, AND STRUCTURING AGENT OF THIS KIND

(71) Applicant: Fritz Egger GmbH & Co. OG, St. Johann in Tirol (AT)

(72) Inventor: Frank Kemmerling, Brilon (DE)

(73) Assignee: Fritz Egger GmbH & Co. OG, St. Johann in Tirol (AT)

( * ) Notice: Subject to any disclaimer, the term of this patent is extended or adjusted under 35 U.S.C. 154(b) by 0 days.

(21) Appl. No.: 18/866,864

(22) PCT Filed: Apr. 3, 2023

(86) PCT No.: PCT/EP2023/058629
§ 371 (c)(1),
(2) Date: Nov. 18, 2024

(87) PCT Pub. No.: WO2023/222297
PCT Pub. Date: Nov. 23, 2023

(65) Prior Publication Data
US 2025/0170762 A1     May 29, 2025

(30) Foreign Application Priority Data
May 19, 2022     (EP) ..................................... 22174214

(51) Int. Cl.
B29C 43/28          (2006.01)
B29C 35/08          (2006.01)
(Continued)

(52) U.S. Cl.
CPC .......... B29C 43/28 (2013.01); B29C 35/0805 (2013.01); B29C 43/46 (2013.01);
(Continued)

(58) Field of Classification Search
CPC ......... B29C 43/28; B29C 43/46; B29C 43/48; B29C 43/44; B29C 33/3807;
(Continued)

(56)                 References Cited

U.S. PATENT DOCUMENTS

| | | | |
|---|---|---|---|
| 8,128,393 B2* | 3/2012 | Rolland | .............. B32B 38/0012 425/363 |
| 11,865,858 B2 | 1/2024 | Kues et al. | |

(Continued)

FOREIGN PATENT DOCUMENTS

| | | |
|---|---|---|
| CN | 109952206 A | 6/2019 |
| DE | 102013007429 A1 | 10/2014 |

(Continued)

OTHER PUBLICATIONS

DIN EN ISO 14577-1, "Metallic Materials—Instrumented indentation test for hardness and materials parameters", Nov. 2015. In German, corresponds to ISO-14577-1-2025.
(Continued)

*Primary Examiner* — Michael P Wieczorek
(74) *Attorney, Agent, or Firm* — The Webb Law Firm

(57)                 ABSTRACT

A method for producing a structuring agent for texturing an embossable material surface, in particular a resin-containing laminate surface, including the steps of providing a web-shaped carrier material made of paper and/or plastic, applying a UV-curable lacquer layer made of acrylated oligomer to the carrier material, forming a three-dimensional embossed structure into the lacquer layer applied to the carrier material and curing the lacquer layer by irradiation with high-energy radiation, preferably UV light, during the molding of the embossed structure. The invention provides that before the UV-curable lacquer layer is applied at least one adhesion promoter layer including acrylated oligomer, a reactive diluent and a photoinitiator which reacts to high- (Continued)

energy radiation, preferably UV radiation, is applied onto the carrier material, and that the lacquer layer having the embossed structure is cured by irradiation with high-energy radiation, preferably UV light, to such an extent that, in the finished state, the structuring agent has an average Martens hardness according to DIN EN ISO 14577 in the range from 10 to 80 N/mm$^2$, preferably in the range from 30 to 80 N/mm$^2$, the indenter used as a test body for measuring the Martens hardness being pressed into the surface of the lacquer layer having the embossed structure. A structuring agent is also disclosed.

13 Claims, 2 Drawing Sheets

(51) Int. Cl.

| | | |
|---|---|---|
| B29C 43/18 | (2006.01) | |
| B29C 43/46 | (2006.01) | |
| B29K 33/04 | (2006.01) | |
| B29K 711/12 | (2006.01) | |

(52) U.S. Cl.
CPC .................. *B29C 2035/0827* (2013.01); *B29C 2043/185* (2013.01); *B29K 2033/04* (2013.01); *B29K 2711/12* (2013.01); *B29K 2995/007* (2013.01); *B29K 2995/0072* (2013.01)

(58) Field of Classification Search
CPC ............ B29C 33/3828; B29C 33/3842; B29C 33/385; B29C 33/3857; B29C 33/3878; B29C 33/40; B29C 33/42
See application file for complete search history.

(56) References Cited

U.S. PATENT DOCUMENTS

| | | | | |
|---|---|---|---|---|
| 2006/0214326 A1* | 9/2006 | Kim | ...................... | B82Y 10/00 |
| | | | | 264/494 |
| 2008/0156421 A1* | 7/2008 | Lee | ...................... | G02B 5/0231 |
| | | | | 156/379.6 |
| 2012/0231223 A1 | 9/2012 | Lee et al. | | |
| 2015/0079341 A1* | 3/2015 | Tazaki | ................... | B29C 33/68 |
| | | | | 264/293 |
| 2019/0310546 A1 | 10/2019 | Lim et al. | | |
| 2021/0129415 A1* | 5/2021 | Kues | ................... | B29C 59/022 |

FOREIGN PATENT DOCUMENTS

| | | |
|---|---|---|
| EP | 2146805 B1 | 11/2011 |
| EP | 3345761 A1 | 7/2018 |
| EP | 3720673 B1 | 2/2021 |

OTHER PUBLICATIONS

ISO-14577-1-2025, "Metallic Materials—Instrumented indentation test for hardness and materials parameters", Jul. 2015.

* cited by examiner

METHOD FOR PRODUCING A STRUCTURING AGENT FOR TEXTURING AN EMBOSSABLE MATERIAL SURFACE, IN PARTICULAR A RESIN-CONTAINING LAMINATE SURFACE, AND STRUCTURING AGENT OF THIS KIND

CROSS-REFERENCE TO RELATED APPLICATIONS

This application is the United States national phase of International Patent Application No. PCT/EP2023/058629 filed Apr. 3, 2023, and claims priority to European Patent Application No. 22174214.1 filed May 19, 2022, the disclosures of which are hereby incorporated by reference in their entireties.

BACKGROUND OF THE INVENTION

Field of the Invention

The invention relates to a method for producing a structuring agent for texturing an embossable material surface, in particular a resin-containing laminate surface, comprising the steps of providing a web-like carrier material made of paper and/or plastic, applying a UV-curable lacquer layer of acrylated oligomer to the carrier material, forming a three-dimensional embossed structure into the lacquer layer applied to the carrier material, and curing the lacquer layer by irradiation with high-energy radiation, preferably UV light, during the forming of the embossed structure.

Description of Related Art

In the context of the present invention, irradiation with high-energy radiation is understood to mean, in particular, irradiation with UV rays (UV light) and also irradiation with electron beams.

Furthermore, the invention relates to a structuring agent for texturing an embossable material surface, in particular a resin-containing laminate surface, in particular produced by the method according to the invention, with a web-like carrier material made of paper and/or plastic and a lacquer layer made of acrylated oligomer applied to the carrier material, which has a three-dimensional embossed structure. The structuring agent can also be referred to as an embossing die.

Decorative laminates are known in the prior art, which are used, for example, as floor coverings or as surface material for walls, ceilings or furniture such as cabinets, worktops and table tops or similar. Such laminates are usually made up of a substrate, e.g. an MDF or HDF board or resin-impregnated paper layers, a decorative layer and a transparent protective layer applied on top. The protective layer is intended to protect the decorative layer from wear, in particular abrasion. For example, classic flooring laminate panels have a melamine resin-impregnated, transparent curing overlay paper as a protective layer. The material of the protective layer often contains particles that increase wear resistance, for example quartz or corundum particles.

In order to exactly imitate the look and feel of natural materials such as wooden floorboards or stone slabs with decorative laminates, such laminates are provided with a three-dimensional surface structure in the prior art, which preferably corresponds to the printed image of the decorative layer of the laminate. For example, to imitate wood planks, indentations are pressed into the transparent protective layer when pressing a laminate structure comprising a wood decor paper, whereby the indentations essentially overlap the wood pores depicted in the wood decor. Such indentations, which are formed to correspond to the pores shown, are also referred to in specialist circles as synchronous pores.

Decorative laminates with fantasy or single-colored decors (unicolor decors) are also known in the prior art, for example laminates for worktops or tabletops whose transparent protective layer or top layer is provided with a three-dimensional surface structure.

For the production of laminates with a three-dimensional surface structure, prior art uses, for example, pressing plates that have a surface structure created by engraving. The laminate is produced using a so-called short-cycle press (KT press) under high pressure and high temperature, whereby the engraved press plate is mounted on a press plate facing the transparent curing protective layer. When pressing the laminate, temperatures of over 120° C. and a pressure of over 50 bar prevail, for example. The production of engraved press plates is cost-intensive. In addition, the press plates are subject to considerable wear due to the high pressure load.

Furthermore, it is known in the prior art to texture resin-impregnated laminate surfaces by means of web-like structuring agent—also called embossing dies—using pressure and temperature, i.e. to provide the laminate surface with a three-dimensional surface structure.

A method for producing such a web-like structuring agent is described, for example, in EP 2 146 805. The process involves applying a curable coating to a web-like plastic film and then bringing it into contact with a structuring roll. During contact with the structuring roll, the coating is cured by means of electron or UV radiation so that the three-dimensional structure is permanently transferred to the coating of the plastic film. The cured coating is then removed from the structuring roll together with the plastic film. Before curing, the coating contains 20 to 50% of an acrylic oligomer, 15 to 35% of a monofunctional monomer and 20 to 50% of a multifunctional monomer for crosslinking. Curing the coating using electron beam radiation is associated with high investment costs and high energy consumption. Furthermore, when reworking the process according to EP 2 146 805, it has been shown that the adhesion of various resins or radiation-curing lacquers to the web-like carrier material is often insufficient, so that some of the resin or lacquer is deposited in the structure of the structuring roll and cures there. As a result, a recurring surface defect then appears in the cured coating on the web-like carrier material. Cleaning the structuring roll so that resin or lacquer deposits are completely removed from its structure is very time-consuming.

EP 3 720 673 discloses a further method for transferring an embossing structure to at least a part of a surface of a coating agent. The essential steps of the method are carried out using a composite of a substrate and an embossed and at least partially cured coating used as the embossing die of an embossing tool. The coating agent used to produce the coating of the composite is a radiation-curable coating agent of defined composition. EP 3 720 673 teaches that there is preferably no further layer between the substrate and the coating of the composite. However, internal tests have shown that the process according to EP 3 720 673 does not result in satisfactory adhesion between the substrate and a comparatively hard coating; rather, when a corresponding composite is used as an embossing die under normal pressing conditions with temperatures of around 185° C. and a pressure of over 50 bar, the coating detaches (delaminates) from the substrate.

In DE 10 2013 007 429, the use of a polyethylene terephthalate film (PET film) etched on at least one surface is proposed for the production of a surface film with texturing or an embossing die with texturing. The etched PET film should exhibit excellent wetting and adhesion to the resins or lacquers used for coating, so that in the manufacturing process of the textured surface film or embossing die no deposition of the resin or lacquer occurs on a texturing roll used for texturing. For etching the PET film, DE 10 2013 007 429 proposes the use of trichloroacetic acid in the presence of precipitated silica. Although this treatment of PET films improves adhesion, it is questionable from an environmental point of view. In addition, such films are difficult to obtain on the market.

SUMMARY OF THE INVENTION

On this basis, the invention is based on the object of providing a method of the type mentioned at the beginning, with which a structuring agent for texturing embossable material surfaces, in particular resin-containing laminate surfaces, can be produced at low cost, which is characterized by a high mechanical and thermal resistance with regard to use in a press. In particular, a corresponding structuring agent is to be provided.

This object is solved by a method with the features specified herein or by a structure agent with the features specified herein. Advantageous embodiments of the solution according to the invention are specified herein.

The method according to the invention is characterized in that, before the UV-curable lacquer layer is applied, at least one adhesion promoter layer comprising acrylated oligomer, a reactive diluent and a photoinitiator which reacts to high-energy radiation, preferably UV radiation, is applied to the carrier material, and in that the lacquer layer having the embossed structure is cured by irradiation with high-energy radiation, preferably UV light, to such an extent that, in the finished state, the structuring agent has an average Martens hardness according to DIN EN ISO 14577 in the range from 10 to 80 N/mm², preferably in the range from 30 to 80 N/mm², the indenter used as a test body for measuring the Martens hardness being pressed into the surface of the lacquer layer having the embossed structure.

By means of the at least one adhesion promoter layer (primer layer) according to the invention, a structuring agent for texturing embossable material surfaces, in particular resin-containing laminate surfaces, can be produced cost-effectively using a method of the type mentioned at the beginning in such a way that the structuring agent has a high mechanical and thermal resistance with regard to use in a press.

The adhesion promoter layer according to the invention makes it possible for the lacquer layer, which can be cured by high-energy radiation, preferably UV light, to be applied after forming a three-dimensional embossed structure in the lacquer layer and subsequent partial or complete curing of the lacquer layer by high-energy radiation, preferably UV radiation, to adhere very well to the carrier material, so that neither when the cured lacquer layer together with the carrier material is removed from the embossing device used to form the embossing structure, nor when the structuring agent produced in this way is removed from a material or laminate surface textured with it, the textured lacquer layer becomes detached or is detached from the carrier material in a way that is visible to the naked eye or is unacceptable.

The cross-cut test according to DIN EN ISO 2409 (date: June 2013) is commonly used to determine the adhesion of coatings. Although the test result does not provide any direct measured values, it can be assessed by comparing it with standard images that show various graded degrees of damage (characteristic values). The standard prescribes the use of cutting blades of certain shapes and dimensions as the test device. To measure with a multi-blade device, a continuous cutting band consisting of several parallel notches is drawn into the coating to be assessed. A further cutting band is then scored at right angles to this. This creates a grid with a large number of squares, the so-called cross-cut. For evaluation, an adhesive tape with a defined adhesive force is pressed onto the grid cut and then pulled off the surface to remove any detached parts. By comparison with the standard images, the characteristic values Gt0 to Gt5 are assigned, whereby Gt0 corresponds to low damage in which no part of the coating has flaked off, whereas Gt5 corresponds to very high delamination or damage in which the flaked-off area of the coating is more than 65% of the parts.

Using the method according to the invention, it was possible to produce texturing agent with very good adhesion of the textured lacquer layer to the carrier material. The cross-cut test according to DIN EN ISO 2409 (date: June 2013) resulted in a cross-cut characteristic value of 0 to less than or equal to 0.5 for the texturing agent produced according to the invention.

The adhesion promoter layer enables a wide processing spectrum from elastic to hard for the lacquer, which can be cured by high-energy radiation, preferably UV light. Furthermore, the acrylated oligomer lacquer used in the method according to the invention, which can be cured by high-energy radiation, preferably UV light, enables the lacquer layer produced from it or the embossed structure formed therein to be set to a high hardness. According to the invention, the structuring agent has an average Martens hardness according to DIN EN ISO 14577 in the range from 10 to 80 N/mm², preferably in the range from 30 to 80 N/mm², in the finished state. This is favorable for a high mechanical and thermal resistance of the structuring agent when used in a heated press. The relatively hard embossed structure enables a long service life of the texturing agent. In addition, a high hardness of the lacquer layer including the embossing structure is advantageous for achieving high molding accuracy, particularly with regard to molding accuracy when pressing a negative structure into an embossable material surface or resin-containing laminate surface. This makes it possible, for example, to produce appropriately textured floor panels or laminate boards that have a relatively high surface roughness or surface roughness depth Rz in accordance with DIN EN ISO 4287.

When determining the indentation or Martens hardness in accordance with DIN EN ISO 14577, the test force F and the indentation depth h are measured continuously during the loading and unloading phase. The Martens hardness (HM) is defined as the ratio of the maximum force F to the corresponding contact area of the test specimen and is specified in the unit N/mm². The test specimen (indenter) is either a pyramid or a spherical indenter which is pressed slowly and at a constant speed into the surface to be tested. The conversion of the indentation depth to the contact surface must be determined for each indenter shape. The contact surface is calculated for the Vickers or Berkovich pyramid usually used as an indenter by the product of the square of the indentation depth h and the constant 26.43. This is known as Martens hardness. The so-called Martens hardness (HM) is then calculated as follows: $HM=F/(26.43 \cdot h^2)$.

The Martens hardness is measured using a FischerScope HM2000S measuring device from the company Helmut Fischer at a temperature of approx. 23° C. and a relative humidity of approx. 50%. The measurement is carried out with a test range of 300 mN/20 s up to a maximum test force of 300 mN in accordance with DIN EN ISO 14577.

According to an advantageous embodiment of the method according to the invention, the at least one adhesion promoter layer is applied to the carrier material with a layer thickness in the range from 0.5 to 12 μm, preferably in the range from 1 to 10 μm, particularly preferably in the range from 2 to 5 μm, based on the dry state of the adhesion promoter layer. The layer thickness of the adhesion promoter layer is preferably applied as thinly as possible. The inventor has surprisingly found that this allows a particularly good bond between the lacquer layer and the carrier material to be achieved. It is assumed by the inventor that the thinnest possible adhesion promoter layer improves or strengthens a bond between the lacquer layer and the carrier material, in that the thin adhesion promoter layer also creates a chemical bond between the substrate surface of the carrier material and the binder of the lacquer layer.

The adhesion promoter layer is preferably dried or cured to such an extent that it is at least contact dry before the UV-curable coating layer is applied.

The at least one adhesion promoter layer which is applied to the carrier material in the method according to the invention can be specified in more detail, in particular with regard to its layer thickness in the dry state, as indicated above. Alternatively or additionally, the at least one adhesion promoter layer can also be specified in more detail with regard to its weight per unit area (application weight) in the dry state, which can be calculated from the layer thickness and the density of the adhesion promoter applied to the carrier material in the dry state. In the case of carrier material made of film or whose surface provided with the adhesion promoter is defined by a film, the weight per unit area of the adhesion promoter in the dry state is, for example, in a range of approx. 0.3 to 15 g/m², preferably in a range of approx. 1 to 5 g/m². In the case of carrier material made of paper or whose surface provided with the adhesion promoter is defined by paper, the weight per unit area of the adhesion promoter in the dry state is, for example, in a range of approx. 1 to 15 g/m², preferably in a range of approx. 4 to 7 g/m².

A further advantageous embodiment of the method according to the invention is characterized in that the web-like carrier material used is a web-like carrier material made of paper and/or plastic which is at least partially permeable to high-energy radiation, in particular UV light, wherein the curing of the lacquer layer being carried out by irradiation with high-energy radiation, preferably UV light, during the forming of the embossed structure in such a way that the irradiation is carried out at least partially from the side of the carrier material facing away from the embossed structure.

The web-like carrier material can thus be moved at a relatively high conveying speed through a device for forming the three-dimensional embossed structure, for example a device equipped with an embossing roll, whereby the initially flowable lacquer layer can be hardened sufficiently quickly during the forming of the embossed structure by means of at least one high-energy radiation, preferably UV light emitting emitter at a favorable position within the device to such an extent that the carrier material together with the lacquer layer having the embossed structure can then be drawn-off or removed from the embossing roll or an embossing tool in a dimensionally stable manner. This embodiment of the invention is particularly advantageous in terms of production technology.

The web-like carrier material used in the method according to the invention, which is at least partially permeable to high-energy radiation, in particular UV light, can also be referred to as a transparent web-like carrier material. A transparent carrier material is understood to be a translucent carrier material which can be transparent or translucent. Transparent materials allow the majority of the light to pass through, although a small amount of light is usually absorbed and scattered. Examples of such transparent carrier materials are films made of polyethylene terephthalate (PET), polycarbonate (PC) or polymethyl methacrylate (PMMA). Translucent materials are characterized by the fact that although light passes through them, the light is scattered in the material. Examples of translucent carrier materials are papers, in particular so-called parchment papers, which can be more or less translucent depending on the design. The grammage (basis weight) of the transparent paper can be between 80 and 180 g/m², for example.

The web-like carrier material used according to the invention can, for example, transmit 60 to 80% of an emitted UV radiation dose in the range from 1,500 to 2,200 mJ/cm². The measured transmitted UV radiation is then approximately in the range of 900 to 1,760 mJ/cm², in particular in the range of 1,300 to 1,500 mJ/cm².

A further advantageous embodiment of the method according to the invention is characterized in that a web of paper is used as the web-like carrier material, an aqueous adhesion promoter being applied to the carrier material to produce the adhesion promoter layer, the adhesion promoter layer being dried at least in the surface region before the UV-curable lacquer layer is applied thereto, and the drying being carried out using temperatures in the range from 80° C. to 160° C., preferably in the range from 90° C. to 140° C., particularly preferably in the range from 100° C. to 120° C.

The water content of the aqueous adhesion promoter improves the bonding of the adhesion promoter with the fibers of the paper web. The water content is then removed or largely reduced by the drying process. In this way, a relatively thin adhesion promoter layer can be achieved, which produces a particularly good bond between the substrate surface of the web-like carrier material (paper) and the binder of the UV-curable lacquer layer.

An advantageous variant of the method according to the invention provides that a plastic film is used as the web-like carrier material, the adhesion promoter layer being cured at least to such an extent by means of high-energy radiation, preferably UV radiation, in particular UV-C radiation, before the UV-curable lacquer layer is applied to the adhesion promoter layer, that the adhesion promoter layer is solid and/or essentially non-adhesive on its surface, wherein the photoinitiator of the adhesion promoter layer is suitable for absorbing light with a wavelength in the range from 250 to 350 nm, preferably in the range from 270 to 330 nm, and wherein the adhesion promoter layer is cured with a UV radiation dose in the range from 60 to 200 mJ/cm², preferably 100 to 160 mJ/cm².

The use of a plastic film as a web-like carrier material is advantageous in terms of material costs and the robustness of the carrier material and thus of the structuring agent. Pre-curing or curing the adhesion promoter layer to the extent that it is solid and/or essentially non-sticky on its surface before the UV-curable lacquer layer is applied to it improves the bond between the substrate surface of the carrier material (plastic film) and the binder of the UV-curable lacquer layer. This design has the particular advantage that the adhesion promoter develops its optimum effect directly at the interface and can therefore be applied in relatively small quantities in order to nevertheless achieve high or excellent adhesion values. The photoinitiator of the adhesion promoter layer used according to this embodiment enables rapid and energy-efficient curing or at least pre-curing of the adhesion promoter layer at the specified UV radiation dose, so that the structuring agent can be produced at a high production speed.

A further advantageous embodiment of the invention provides that the adhesion promoter layer contains 10 to 90% by weight, preferably 40 to 70% by weight, of acrylated oligomer, at least 8% by weight, preferably at least 20% by weight, of reactive diluent, 0.5 to 10% by weight of UV-radiation-reactive photoinitiator and optionally 0.1 to 3% by weight of one or more additives from a group comprising defoamers and substrate wetting agents, the amounts of all components contained in the adhesion promoter layer adding up to 100% by weight. The acrylated oligomer is preferably at least di- or trifunctional, particularly preferably higher-functional. For example, polyurethane acrylate is used as the acrylated oligomer. The reactive diluent reduces the viscosity of the adhesion promoter. A low viscosity of the adhesion promoter favors the formation of a thin, full-surface adhesion promoter layer on the substrate surface of the web-like carrier material when a small amount of adhesion promoter is applied. The viscosity of the adhesion promoter is preferably reduced to a minimum for this purpose.

The defoamer optionally contained in the adhesion promoter is used to combat (dissolve) air or gas inclusions occurring in the liquid adhesion promoter layer. Such inclusions, which occur in the form of foam bubbles, e.g. micro and macro foam bubbles, can cause pores and craters in the adhesion promoter layer, which prevent optimum adhesion between the substrate surface of the web-like carrier material and the binder of the subsequently applied UV-curable lacquer layer and/or reduce the surface quality of the structuring agent.

The substrate wetting agent optionally contained in the adhesion promoter serves to adjust the interfacial energy between the substrate surface of the web-like carrier material and the liquid adhesion promoter. For example, the interfacial energy or surface tension on the substrate is reduced with the substrate wetting agent. This allows the wetting of the substrate surface to be optimized, so that an even and good wetting of all areas of the substrate surface and thus a well adhering, non-porous adhesion promoter layer is achieved.

UV-curable reactive diluents that can be used in the adhesion promoter include, for example, 1,6-hexanediol diacrylate (HDDA), dipropylene glycol diacrylate (DPGDA), tripropylene glycol diacrylate (TPGDA), ethylene glycol dimethacrylate (EGDMA), triethylene glycol divinyl ether (DVE-3) or combinations/mixtures of these diluents. As photoinitiator reacting to UV radiation, monoacylphosphine oxide (MAPO), bisacylphosphine oxide (BAPO), 2-hydroxy-2-methylphenylpropanone (HMPP), 1-hydroxycyclohexylphenyl ketone (CPK) and/or methylbenzoyl formate (MBF) are used in the adhesion promoter layer, for example.

Optionally, the adhesion promoter layer may contain aminopropyltriethoxysilane (AMEO), for example in a proportion in the range from 3 to 8% by weight.

According to a further embodiment of the method according to the invention, the lacquer used for the UV-curable lacquer layer contains 30 to 95% by weight of acrylated oligomer, 10 to 70% by weight of mono- or multifunctional monomer, 1 to 5% by weight of photoinitiator, and optionally 1 to 6% by weight of one or more additives from a group comprising defoamers, substrate wetting agents, release additives, waxes and anti-settling agents, the amounts of all the constituents contained in the UV-curable coating adding up to 100% by weight. A correspondingly composed UV-curable lacquer makes it possible to set a high hardness of the lacquer layer produced or the embossed structure formed therein.

Surprisingly, the inventor has found that a UV-curable lacquer composed in this way can be used to cost-effectively produce a structuring agent of the type mentioned at the beginning, the embossed structure of which formed in the lacquer layer has a high hardness and molding accuracy, so that the structuring agent according to the invention can be used to press correspondingly large structural depths into an embossable material surface, in particular a resin-containing laminate surface, without noticeable or considerable loss of depth.

According to a further embodiment, the lacquer used for the UV-curable lacquer layer contains 50 to 95% by weight of acrylated oligomer and/or 10 to 40% by weight of mono- or multifunctional monomer and/or 1 to 3% by weight of photoinitiator and/or 1 to 5% by weight of one or more additives from a group comprising defoamers, substrate wetting agents, release additives, waxes and anti-settling agents, the quantities of all the constituents contained in the UV-curable coating adding up to 100% by weight. By using such a lacquer, a structuring agent of the type mentioned above can be realized in a particularly advantageous way. The relatively high proportion of acrylated oligomer in combination with the mono- or multifunctional monomer makes it possible to set a high hardness of the embossed structure formed from the lacquer. By adding a release additive, it is possible to optimize the precise separation of the embossed structure produced in the lacquer layer from the embossing tool, e.g. an embossing roll, and the precise separation of the structuring agent from a material surface textured with it. The addition of wax as an additive can prevent suboptimal hardening on the surface of the lacquer layer combined with permanent stickiness of the coating layer. Sub-optimal curing and permanent tackiness can result from the interaction of atmospheric oxygen with the applied lacquer layer. The addition of an anti-settling agent prevents one or more specific components of the lacquer from settling, so that the composition, in particular the hardness of the lacquer layer or embossed structure produced, is essentially homogeneous across its layer thickness. With regard to the addition of a defoamer and/or substrate wetting agent to the lacquer composition and the resulting effects, reference is made to the above remarks on corresponding additives of the adhesion promoter in order to avoid repetition.

A further embodiment of the method according to the invention provides that the photoinitiator of the UV-curable lacquer is selected such that this photoinitiator is suitable for absorbing light with a wavelength in the range from 360 to 420 nm, preferably in the range from 390 to 400 nm. This embodiment of the invention enables rapid and energy-efficient curing of the lacquer layer provided with the embossed structure, so that the web-like structuring agent can be produced at high production speed. In the manufacturing method according to the invention, the production or web speed of the structuring agent can be in the range of 5 to 15 m/min, for example.

According to a further embodiment of the method according to the invention, the adhesion promoter or the adhesion promoter layer and/or the lacquer used for the UV-curable lacquer layer contain urethane acrylate, polyester acrylate, epoxy acrylate or a mixture of two or three of these acrylates as an acrylated oligomer. These acrylates, in particular urethane acrylates, are characterized by high toughness, good adhesion and high abrasion resistance. The structuring agent produced according to the invention thus has corresponding toughness and strength properties, which give it a high degree of robustness for multiple use. This embodiment also contributes to high molding accuracy or embossing accuracy when texturing the relevant material surface, e.g. laminate surface.

A further advantageous embodiment of the method according to the invention is characterized in that the UV-curable lacquer layer is cured by means of at least one UV-light-emitting LED lamp, emitting a UV radiation power in the range from 8 to 16 $W/cm^2$, preferably in the range from 10 to 14 $W/cm^2$. This embodiment of the invention makes it possible to manufacture structuring agent of the type mentioned here in an energy-efficient manner and at low cost with relatively little system-technical effort.

A further advantageous embodiment of the method according to the invention provides that the UV-curable lacquer layer is finally cured by means of at least one medium-pressure mercury vapor lamp or at least one UV-C lamp, the final curing preferably being carried out using a UV radiation dose in the range from 500 to 3,000 $mJ/cm^2$. This embodiment of the invention makes it possible to produce structuring agent of the type mentioned here at a high production speed. During the molding of the embossed structure, the UV-curable lacquer layer applied to the adhesion promoter layer is partially cured (pre-curing). The lacquer layer is hardened (partially hardened) to such an extent that the composite of web-like carrier material, adhesion promoter and lacquer layer can be removed from the embossing tool, preferably an embossing roll with high molding accuracy, so that the embossed structure formed in the lacquer layer is removed from the embossing tool essentially without loss and with a stable shape. During this first curing step, for example, approx. 50 to 80% of the curing required for complete curing can take place. The final curing (post-curing) of the composite removed from the embossing tool is then carried out by means of at least one medium-pressure mercury vapor lamp or at least one UV-C lamp using a UV radiation dose which is preferably in the range from 500 to 3,000 $mJ/cm^2$, for example in the range from 800 to 2,800 $mJ/cm^2$, in particular in the range from 1,000 to 2,500 $mJ/cm^2$. The curing (pre-curing) of the UV-curable lacquer layer applied to the adhesion promoter layer thus takes place while the lacquer layer is in contact with the embossing tool, whereas the final curing (post-curing) of the lacquer layer takes place when the lacquer layer is out of contact with the embossing tool.

If an embossing roller or the like is used in the method according to the invention to form the embossed structure, the structure or composite formed from the web-like carrier material, the adhesion promoter layer and the lacquer layer is preferably guided around the embossing roller with a wrap angle in the range from approx. 60° to 200°, particularly preferably in the range from approx. 100° to 180°.

A further advantageous embodiment of the method according to the invention is characterized in that the embossed structure is formed in the UV-curable lacquer layer in such a way that, after curing of the lacquer layer, it has an average roughness depth Rz according to DIN EN ISO 4287 in the range from 40 to 200 μm, preferably in the range from 100 to 200 μm. With an appropriately designed structuring agent, three-dimensional surface structures can be produced in embossable material surfaces, in particular resin-containing laminate surfaces, which give the surface in question the appearance of natural material, for example the appearance of a wood grain with pores.

The application quantity and thus the application weight of the UV-curable coating layer depends in particular on the required or achievable average roughness depth Rz of the cured coating layer. Furthermore, for economic reasons, it is expedient to limit the application quantity and thus the application weight of the UV-curable coating layer in order to avoid unnecessary material costs. In the method according to the invention, the application weight (application quantity) of the UV-curable coating layer is, for example, in a range from 10 to 250 $g/m^2$, preferably in a range from 25 to 200 $g/m^2$, particularly preferably in a range from 30 to 100 $g/m^2$.

The average roughness depth Rz is the arithmetic mean of the individual roughness depths of five consecutive measurement sections in a roughness profile. The average roughness depth Rz is determined as follows: A defined measuring section on the surface of the workpiece or structuring agent in question is divided into seven individual measuring sections, whereby the average measuring sections are of equal size. The roughness depth Rz is only determined using these five measuring sections, as the Gaussian filter to be used requires half a measuring section before or after. The difference between the maximum and minimum value is determined for each of these individual measuring sections of the profile. The mean value is calculated from the five individual roughness depths obtained in this way. The roughness depth Rz is measured in accordance with DIN EN ISO 4287 and DIN EN ISO 4288. The measuring device used to measure the roughness depth Rz must comply with DIN EN ISO 3274. The profile filter or filters used must comply with DIN EN ISO 11562.

A further subject-matter of the present invention is a structuring agent for texturing an embossable material surface, in particular a resin-containing laminate surface, in particular produced by a method according to one of the above-mentioned embodiments, with a web-like carrier material made of paper and/or plastic and a lacquer layer made of acrylated oligomer applied to the carrier material, which has a three-dimensional embossed structure, characterized in in that the lacquer layer is bonded to the carrier material via at least one adhesion promoter layer of acrylated oligomer, a reactive diluent and a photoinitiator which reacts to UV radiation, the structuring agent in the finished state having an average Martens hardness according to DIN EN ISO 14577 in the range from 10 to 80 $N/mm^2$, preferably in the range from 30 to 80 $N/mm^2$, the indenter used as a test body for measuring the Martens hardness having been pressed into the surface of the lacquer layer having the embossed structure.

The structuring agent according to the invention is characterized by the advantages described above with regard to the method for producing the structuring agent according to the invention.

An advantageous embodiment of the structuring agent according to the invention is characterized in that its adhesion promoter layer contains 10 to 90% by weight, preferably 40 to 70% by weight, of acrylated oligomer, at least 8% by weight, preferably at least 20% by weight, of reactive diluent, 0.5 to 10% by weight of UV-radiation-reactive photoinitiator and optionally 0.1 to 3% by weight of one or more additives from a group comprising defoamers and substrate wetting agents, the amounts of all components contained in the adhesion promoter layer adding up to 100% by weight. The correspondingly designed structuring agent is characterized by a high mechanical and thermal resistance for its use in a heated press, for example a CPL double belt press.

According to a further embodiment of the structuring agent, it is characterized in that its lacquer layer, which has the embossed structure, has an average roughness depth Rz according to DIN EN ISO 4287 in the range from 10 to 200 μm, preferably in the range from 40 to 200 μm, particularly preferably in the range from 100 to 200 μm after curing.

The application weight of the UV-curable coating layer is, for example, in the range from 10 to 250 g/m², preferably in the range from 25 to 200 g/m², particularly preferably in the range from 30 to 100 g/m².

The structuring agent according to the invention, if its web-like carrier material is a plastic film web that is at least partially permeable to high-energy radiation, in particular UV radiation, can also be used advantageously in the so-called CCI method for texturing embossable paint surfaces. CCI stands for Calander Coating Inert. The CCI method can be used to provide paintable material boards, such as MDF, HDF or plastic boards, with a high-gloss or matt paint surface. In this method, the material surface, preferably the wood-based material surface, is dried or cured by means of UV light through a transparent film in a calender after the application of UV lacquer. In the CCI method, the material surface is preferably first primed and then UV lacquer is applied as a final lacquer. The material plate coated with liquid UV lacquer is fed directly into the calender. There, the surface hardens under inert conditions. In other words, "encapsulated drying" of the lacquer coated material plate takes place under a film. This film can advantageously be the structuring agent according to the invention with a plastic film web that is at least partially permeable to UV radiation as a carrier material. In this way, material panels with a textured lacquer surface can be produced that meet the highest quality requirements.

BRIEF DESCRIPTION OF THE DRAWINGS

The invention is explained in more detail below with the aid of a drawing showing examples of embodiments. It shows schematically FIG. 1 a method and a device, respectively, for producing a structuring agent for texturing an embossable material surface, in particular a resin-containing laminate surface, in a side view.

DESCRIPTION OF THE INVENTION

Figure 1:
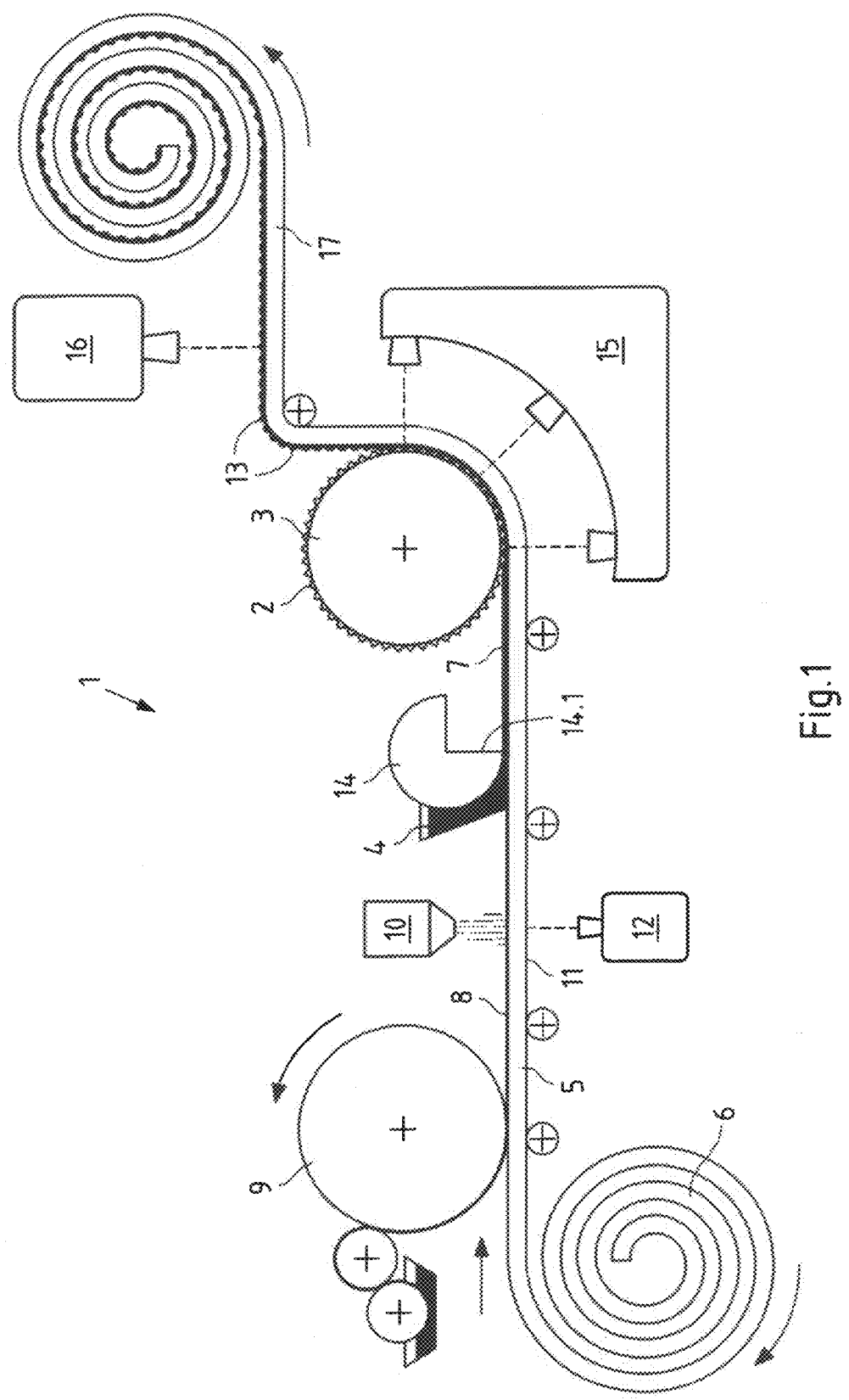

FIG. 1 schematically shows a device 1 which can be used to carry out the method according to the invention and on which the method according to the invention is exemplarily illustrated. By means of this device, three-dimensional structures 2, in particular reproductions of wood grain, natural stone, mosaic pattern structures and/or tile pattern structures, can be transferred from a corresponding master structure, which is designed for example in the form of an embossing roll 3, to a carrier material 5 coated with UV-curable lacquer 4.

The carrier material 5 is a web-like carrier material made of paper and/or plastic that is at least partially permeable to high-energy radiation, in particular UV light. The carrier material 5 is provided as a roll 6 in wound form. For example, a film that is permeable to UV radiation and made of polyethylene terephthalate (PET), polyethylene (PE), polypropylene (PP), polycarbonate (PC), polymethyl methacrylate (PMMA), polyvinyl chloride (PVC) or another plastic that is permeable to UV radiation is used as carrier material 5. The film can also be referred to as a transparent film. The thickness of the film is, for example, in the range of 50 to 200 μm, preferably in the range of 75 to 125 μm, particularly preferably in the range of 100 to 125 μm. Alternatively, transparent paper that is permeable to UV radiation is used as the web-like carrier material 5. The basis weight of the paper is, for example, in the range from 80 to 180 g/m², preferably in the range from 150 to 170 g/m².

A UV-curable lacquer layer 7 of acrylated oligomer is applied to the carrier material 5, into which a three-dimensional embossed structure is subsequently formed. According to the invention, at least one adhesion promoter layer 8, which is composed of acrylated oligomer, a reactive diluent and a photoinitiator that reacts to UV radiation, is applied to the carrier material 5 before the UV-curable lacquer layer 7 is applied.

The adhesion promoter layer 8 contains, for example, 10 to 90% by weight, preferably 40 to 70% by weight, of acrylated oligomer, at least 8% by weight, preferably at least 20% by weight, of reactive diluent and 0.5 to 10% by weight, preferably 0.5 to 5% by weight, of photoinitiator which reacts to UV radiation.

According to a preferred embodiment, the adhesion promoter used for the adhesion promoter layer 8 or the adhesion promoter layer formed therewith may have the following composition:

- 60 to 90% by weight of Ebercryl 4265 from the company Allnex (as an acrylated oligomer or comparable polyurethane acrylate),
- 10 to 30% by weight of triethylene glycol divinyl ether (e.g. Ashland Rapidure DVE-3 or comparable monomer),
- 5 to 10% by weight methylbenzoyl formate (MBF or comparable UV-reactive photoinitiator) and
- 0.1 to 3% by weight of one or more additives from a group comprising defoamers and substrate wetting agents, the quantities of all the constituents contained in the adhesion promoter layer adding up to 100% by weight.

The photoinitiator is suitable, for example, for absorbing light with a wavelength in the range from 250 to 350 nm, preferably in the range from 270 to 330 nm. The adhesion promoter is applied to the web-shaped carrier material 5, for example by means of an engraved or rubberized application roll 9.

If transparent paper that is permeable to UV radiation is used as the carrier material 5, the adhesion promoter is preferably applied to the paper web in aqueous form to form the adhesion promoter layer 8 and the adhesion promoter layer 8 is thermally dried before the UV-curable lacquer layer 7 is applied. Drying can be carried out, for example, by means of a radiant heater device 10 facing the adhesion promoter layer 8. Alternatively or additionally, a thermal drying device, for example a radiant heater device (not shown), can also be arranged on the side (underside or reverse side) 11 of the paper web 5 facing away from the adhesion promoter layer 8.

The application quantity of the aqueous adhesion promoter is adjusted so that the adhesion promoter layer 8 in the dry state has a layer thickness in the range from 0.5 to 12 μm, preferably in the range from 1 to 10 μm, particularly preferably in the range from 2 to 5 μm. In other words, the application quantity of the aqueous adhesion promoter on the paper web is adjusted, for example, so that the adhesion promoter layer 8 in the dry state has a weight per unit area in the range of approx. 1 to 15 g/m$^2$, preferably in the range of approx. 4 to 7 g/m$^2$. The drying of the adhesion promoter layer 8 takes place, for example, using temperatures in the range from 80° C. to 160° C., preferably in the range from 90° C. to 140° C., particularly preferably in the range from 100° C. to 120° C.

If a plastic film web permeable to UV radiation is used instead of a paper web, the adhesion promoter is preferably applied to the plastic film web in non-aqueous form to form the adhesion promoter layer 8 and the adhesion promoter layer 8 is cured by means of UV radiation before the UV-curable lacquer layer 7 is applied until the adhesion promoter layer 8 is solid and/or essentially non-adhesive on its surface.

This at least partial curing of the adhesion promoter layer 8 can be carried out, for example, by means of one or more UV lamps 12, preferably one or more UV light-emitting LED lamps, which face the adhesion promoter layer and/or are arranged on the opposite side (underside or reverse side) 11 of the web-like plastic film. The adhesion promoter layer 8 is cured, for example, with a UV radiation dose in the range from 60 to 200 mJ/cm$^2$, preferably 100 to 160 mJ/cm$^2$.

Furthermore, it is also within the scope of the invention to carry out at least partial curing of the adhesion promoter layer 8 by combining thermal drying and radiation curing, as described above.

The application quantity of the non-aqueous adhesion promoter is adjusted so that the adhesion promoter layer 8 formed therefrom has a layer thickness in the range from 0.5 to 12 μm in the dry state, preferably in the range from 1 to 10 μm, particularly preferably in the range from 2 to 5 μm. In other words, the application quantity of the non-aqueous adhesion promoter on the plastic film web is adjusted, for example, so that the adhesion promoter layer 8 in the dry state has a weight per unit area in the range of approx. 0.3 to 15 g/m$^2$, preferably in the range of approx. 1 to 5 g/m$^2$.

After at least partial drying or at least partial curing of the adhesion promoter layer 8, the UV-curable lacquer of acrylated oligomer is applied to it for the subsequent forming of a three-dimensional embossed structure 13.

For the UV-curable lacquer layer 7, a lacquer is preferably used as a textured lacquer that contains 30 to 95% by weight acrylated oligomer,
10 to 70% by weight of mono- or multifunctional monomer,
1 to 5% by weight of photoinitiator, and optionally
1 to 6% by weight of one or more additives from a group comprising defoamers, substrate wetting agents, release additives, waxes and anti-settling agents, the amounts of all the constituents contained in the UV-curable coating adding up to 100% by weight. The photoinitiator of the UV-curable lacquer is suitable for absorbing light with a wavelength in the range from 360 to 420 nm, preferably in the range from 390 to 400 nm.

The UV-curable coating can be applied by means of a roller or doctor blade application device, preferably a Commabar application device 14. The Commabar application device 14 has a special doctor blade which is formed from a roller into which a recess 14.1 of approx. 90° has been machined. This recess 14.1 makes the profile bar-shaped blade look like a comma in the side view (cross-sectional view). The adjustment of the commabar or the outlet opening limited by the commabar and the associated lacquer box can be made by changing the horizontal and vertical position as well as by changing the angle of rotation. Due to the rounding of the blade geometry, the shear forces acting on the UV-curable lacquer are lower than with conventional doctor blades. The Commabar system is advantageous when applying dilatant, viscoelastic UV lacquers. The possible variation of application weight and viscosity is particularly large with the Commabar system.

The UV-curable lacquer layer is brought into contact with the embossing roll 3 or another master structure in a flowable state and therefore with relatively low pressure, so that the UV-curable lacquer reaches the recesses of the outer surface of the embossing roller 3. The composite formed from the carrier material 5, the adhesion promoter layer 8 and the lacquer layer 7 is guided around the embossing roller (master structure) 3 with a clearly defined wrap angle (see FIG. 1). The wrap angle can be in the range from 60° to 200°, preferably in the range from 100° to 180°.

The lacquer layer 7 is hardened while it is in contact with the embossing roll (master structure) 3, i.e. while the embossed structure 13 is being formed, by irradiation with high-energy radiation, preferably UV light, the irradiation preferably taking place from the side of the radiation-permeable, web-like carrier material 5 facing away from the embossed structure 13. The irradiation device used for this purpose is denoted with 15 in FIG. 1. In addition to the irradiation in the area of the embossing roll 3 from below, the lacquer layer in the area of the embossing roll 3 can also be irradiated from at least one of the sides of the embossing roll 3.

Preferably, at least one UV-light emitting LED lamp is used as the irradiation device 15. The irradiation device 15 cures the lacquer layer 7 by emitting a UV radiation power in the range from 8 to 16 W/cm$^2$, preferably in the range from 10 to 14 W/cm$^2$, for example approx. 12 W/cm$^2$.

The lacquer layer 7 is hardened (partially hardened) in contact with the embossing roll (master structure) 3 to such an extent that the composite of web-like carrier material 5, adhesion promoter layer 8 and lacquer layer 7 can be drawn from the embossing roll 3 with a high degree of molding accuracy. In particular, the embossed structure 13 molded into the lacquer layer can be removed from the embossing roll 3 after this hardening essentially without loss of depth and with a stable shape. Subsequently, post-curing (final curing) of the lacquer layer 7 and the underlying adhesion promoter layer 8 is carried out by means of at least one medium-pressure mercury vapor emitter 16 or at least one UV-C emitter, this post-curing or final curing preferably being carried out using a UV radiation dose in the range from 500 to 3,000 mJ/cm$^2$. The post-curing or final curing of the structure generator 17 is carried out, for example, with a surface-specific power of approx. 200 W/cm$^2$.

After this final post-curing (final hardening), the embossed structure 13 of the texturing agent 17 produced in this way has an average roughness depth Rz according to DIN EN ISO 4287 in the range from 10 to 200 μm, preferably in the range from 40 to 200 μm, particularly preferably in the range from 100 to 200 μm.

At the end of the device 1 for carrying out the production method according to the invention, the finished structuring agent 17 is wound up.

Figure 2:
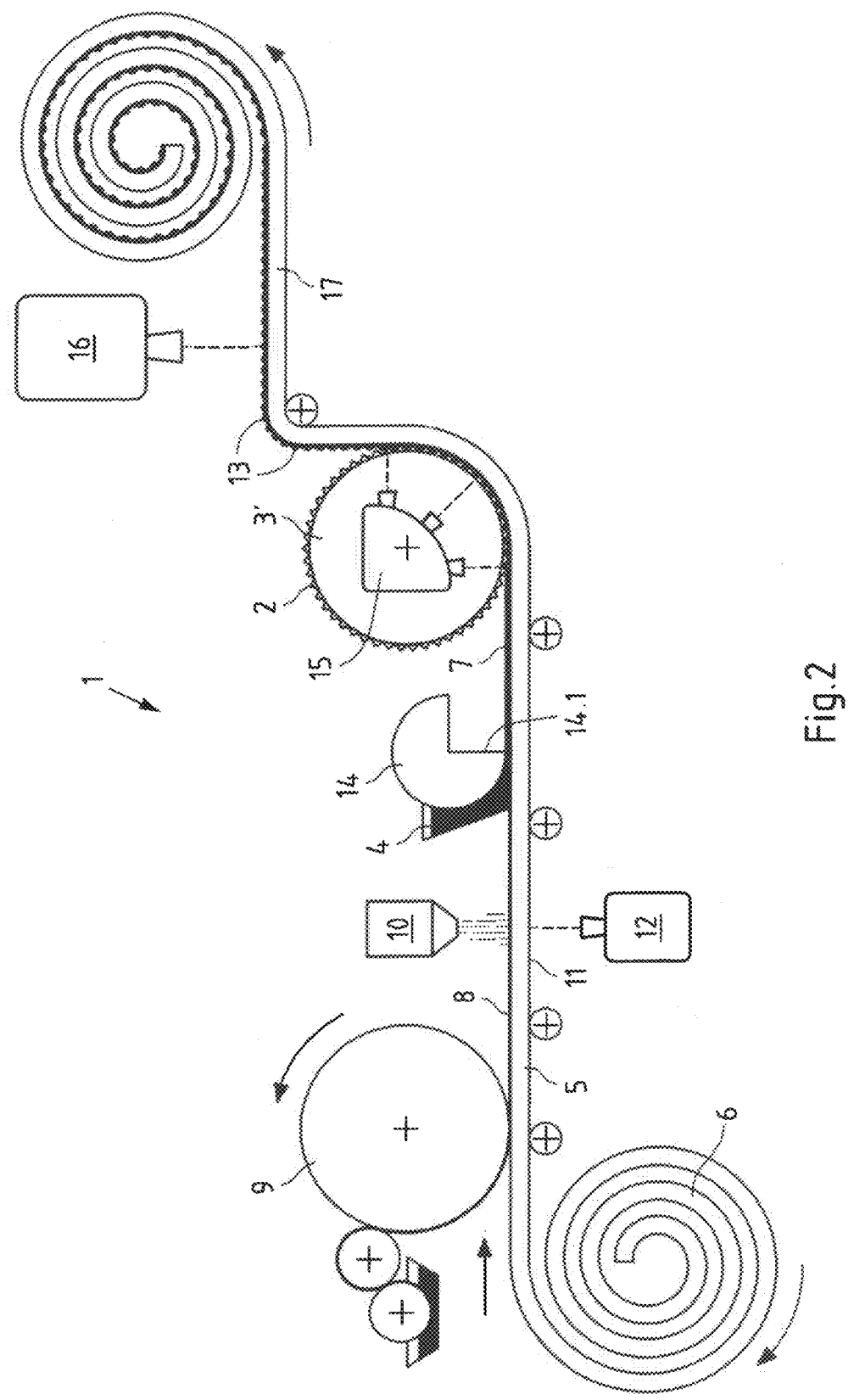
FIG. 2 a further embodiment of a method and a device, respectively, for producing a structuring agent for texturing an embossable material surface, in particular a resin-containing laminate surface, in a side view.

The embodiment example outlined in FIG. 2 differs from the example disclosed in FIG. 1 in that the embossing roll 3', as a hollow roll, has a radiolucent or transparent roller shell, at least one irradiation device 15 being arranged inside the embossing roll 3' and directed towards the contact area in which the UV-curable lacquer layer 7 contacts the embossing roll 3'.

Further examples of compositions of the adhesion promoter used in the method according to the invention or in corresponding experiments and of the radiation-curable lacquer (top coat) for shaping the embossed structure 13 of the structuring agent 17 and comparative examples are given below. In particular, average values measured in laboratory tests for the Martens hardness and measured values for the roughness depth Rz for certain web-like carrier materials are also given. Furthermore, measurement results of the cross-cut test are given.

Adhesion promoters used in tests on the method according to the invention:

| Internal designation | Composition |
|---|---|
| V1 | 50 wt. % PU acrylate (difunctional), 30 wt. % HDDA, 15 wt. % EGDMA and 5 wt. % MBF; |
| V2 | 37.5 wt. % PU acrylate (6-functional), 50 wt. % DPGDA, 10 wt. % HDDA and 2.5 wt. % MBF; |
| V2B | 20 wt. % PU acrylate (6-functional), 72.5 wt. % HDDA, wt. % AME0 and 2.5 wt. % MBF. |

Radiation-curable top lacquers (topcoats) used in tests on the process according to the invention:

| Internal designation | Composition |
|---|---|
| Topcoat A | 76 wt. % urethane acrylate, aliphatic, 2 to 3-functional, 18 wt. % monomers, mono- or difunctional, 4 wt. % additives (defoamer, substrate wetting agent, release additive, wax, anti-settling agent), 2 wt. % photoinitiator (e.g. MAPO, BAPO, HMPP, CPK, MBF); |
| Topcoat B | 48 wt. % urethane acrylate, aromatic, 3 to 5-functional, 46 wt. % monomers, difunctional, 4 wt. % additives (defoamer, substrate wetting agent, release additive, wax, anti-settling agent), 2 wt. % photoinitiator (e.g. MAPO, BAPO, HMPP, CPK, MBF); |
| Topcoat C | 94 wt. % urethane acrylate, aliphatic, 5 to 6-functional, 4 wt. % additives (defoamer, substrate wetting agent, release additive, wax, anti-settling agent), 2 wt. % photoinitiator (e.g. MAPO, BAPO, HMPP, CPK, MBF). |

Martens hardness of structuring agent produced according to the invention and reference materials:

| | | | | |
|---|---|---|---|---|
| 1 | PET film Hostaphan | 75 µm | without (uncoated) | 39.8 |
| 2 | PET film Hostaphan | 75 µm | V1/A | 43.5 |
| 3 | PET film Hostaphan | 75 µm | V1/B | 12.5 |
| 4 | PET film Hostaphan | 75 µm | V1/C | 74.2 |
| 5 | PET film Hostaphan | 75 µm | V2B/A | 29 |
| 6 | PET film Hostaphan | 75 µm | V2B/B | 10.7 |
| 7 | PET film Hostaphan | 75 µm | V2B/C | 44.6 |
| 8 | paper | 180 µm | without (uncoated) | 25.8 |
| 9 | paper | 180 µm | aqueous. primer/A | 44.7 |

-continued

| | | | |
|---|---|---|---|
| 10 | without (top lacquer stripped from film without primer) | — | top lacquer C  44.3 |

The Martens hardness was measured for the above-mentioned examples 1 to 10 using a FISCHERSCOPE HM2000S measuring device from the company Helmut Fischer in accordance with DIN EN ISO 14577, with the test range used being 300 mN/20 s. In order to illustrate the influence of the carrier material 5 on the measured surface hardness of the texturing agent 17, the Martens hardness of the carrier material (PET film Hostaphan® from the company Mitsubishi or paper, respectively) was also measured on its own, i.e. without adhesion promoter and without top lacquer (see examples 1 and 8). In addition, the Martens hardness of a radiation-curable lacquer was measured separately for comparison by removing the lacquer (namely topcoat C) from a film to which the lacquer had previously been applied without primer (adhesion promoter) and then measuring it separately (see example 10).

Cross-cut tests to determine the adhesion of the lacquer coating of the structuring agent 17 according to the above examples 2, 3, 4 and 6 each resulted in a characteristic value Gt of 0. This means that in these examples no flaking and thus no significant damage (de-adhesion) of the respective lacquer coating of the structuring agent 17 could be detected. In examples 5 and 7, the cross-cut tests resulted in characteristic values Gt of 2 and 1 respectively. However, these Gt values are also good characteristic values, as an average characteristic value Gt of at least 3.5 is usually still classified as a sufficient adhesion value.

Comparative tests in which the UV-curable lacquer layer consisting of the above-mentioned top lacquer A, B or C was applied directly to a plastic film (75 µm PET film Hostaphan® from the company Mitsubishi), i.e. without using one of the above-mentioned adhesion promoters V1, V2 or V2B, each resulted in a very high degree of non-adhesion (Gt value 5) in the cross-cut test.

In order to assess the molding accuracy of the embossed structure 13 of structuring agent 17 produced according to the invention, their average roughness depth Rz was measured according to DIN EN ISO 4287 and compared with the average roughness depth Rz of the respective embossing roll 3 used. One of these embossing rolls has a simulated wood structure as the master structure, while another embossing roll has a large number of negative pyramids as the master structure.

| Master structure or texturing means | Lacquer quantity | Measured average roughness depth Rz |
|---|---|---|
| Embossing roll with wood texture as master texture | | 43.782 µm |
| Lacquered PET film Hostaphan | 100 g/m² | 40.36 µm |
| Lacquered parchment paper | 100 g/m² | 40.176 µm |
| Embossing roll with negative pyramids as master structure | 150 µm | |
| Lacquered PET film Hostaphan | 90 g/m² | 161,443 µm |

On the basis of the above-mentioned measured values of the average roughness depth Rz, it can be seen that the molding accuracy of the embossed structure is excellent in the case of structuring agent produced according to the invention. It was also possible to determine by means of microscope images that the method according to the invention produces a true-to-original impression of the master structure of the embossing roll 3 in the embossed structure 13 of the radiation-cured top lacquer of the texturing agent 17.

The execution of the invention is not limited to the embodiments shown in the schematic drawing. Rather, numerous variants are conceivable which make use of the invention disclosed in the claims even if the design differs from the examples. For example, the thermal drying or curing of the adhesion promoter layer 8 prior to the application of the UV-curable lacquer layer 7 can be carried out only from one side, for example from the top of the adhesion promoter layer 8. Furthermore, several irradiation devices, preferably LED lamps emitting UV light, can be assigned to the embossing roll 3, which are arranged both outside and inside the embossing roll 3, which has a transparent roller shell, for curing the lacquer layer 7.

The invention claimed is:

1. A method for producing agent an embossing die for texturing an embossable material surface of a decorative laminate:

providing a carrier material made of paper and/or plastic, said carrier having a thickness of from 50 to 200 μm;

applying a UV-curable lacquer layer of acrylated oligomer onto the carrier material, forming a three-dimensional embossed structure into the lacquer layer applied to the carrier material, and curing the lacquer layer by irradiation with UV light during the forming of the embossed structure, wherein before the UV-curable lacquer layer is applied, at least one adhesion promoter layer comprising acrylated oligomer, a reactive diluent and a photo initiator which reacts to UV radiation, is applied onto the carrier material, and the lacquer layer having the embossed structure is cured by irradiation with UV light, to such an extent that, when finished curing, the surface of the lacquer layer of the embossing die having the embossed structure has an average Martens hardness according to DIN EN ISO 14577 in the range from 10 to 80 N/mm$^2$, and, after curing, the lacquer layer having the embossed structure has an average roughness depth (Rz) according to DIN EN ISO 4287 of from 10 to 200 μm.

2. The method according to claim 1, wherein the at least one adhesion promoter layer is applied onto the carrier material with a layer thickness in the range from 0.5 to 12 μm, based on the dry state of the adhesion promoter layer.

3. The method according to claim 1 wherein the carrier material is at least partially permeable to UV light, wherein the curing of the lacquer layer is carried out by irradiation with UV light, during the forming of the embossed structure in such a way that the irradiation is carried out at least partially from the side of the carrier material facing away from the embossed structure.

4. The method according to claim 1, wherein paper is used as the carrier material, an aqueous adhesion promoter being applied onto the carrier material to produce the adhesion promoter layer, the adhesion promoter layer being dried at least in the surface region before the UV-curable lacquer layer is applied thereto, and the drying being carried out using temperatures in the range from 80° C. to 160° C.

5. The method according to claim 1, wherein a plastic film is used as the carrier material, the adhesion promoter layer being cured to such an extent via UV radiation, before the UV-curable lacquer layer is applied onto the adhesion promoter layer, that the adhesion promoter layer is solid and/or substantially non-adhesive on its surface, wherein the photo initiator of the adhesion promoter layer is suitable for absorbing light with a wavelength in the range from 250 to 350 nm, and wherein the adhesion promoter layer is cured with a UV radiation dose in the range from 60 to 200 mJ/cm$^2$.

6. The method according to claim 1, wherein the adhesion promoter layer comprises 10 to 90% by weight of acrylated oligomer, at least 8% by weight of reactive diluent, 0.5 to 10% by weight of photo initiator which reacts to UV radiation and optionally 0.1 to 3% by weight of one or more additives selected from the group consisting of defoamers and substrate wetting agents, the amounts of all components contained in the adhesion promoter layer adding up to 100% by weight.

7. The method according to claim 1, wherein a lacquer is used for the UV-curable lacquer layer comprising 30 to 95% by weight of acrylated oligomer, 10 to 70% by weight of mono- or multifunctional monomer, 1 to 5% by weight of photo initiator, and optionally 1 to 6% by weight of one or more additives selected from the group consisting of defoamers, substrate wetting agents, release additives, waxes and anti-settling agents, wherein the amounts of all components contained in the UV-curable coating add up to 100% by weight.

8. The method according to claim 1, wherein the adhesion promoter layer and/or the lacquer used for the UV-curable lacquer layer comprises urethane acrylate, polyester acrylate, epoxy acrylate or a mixture of two or three of these acrylates as an acrylated oligomer.

9. The method according to claim 1, wherein the UV-curable lacquer layer is cured via at least one UV-light-emitting LED emitter, emitting a UV radiation power in the range from 8 to 16 W/cm$^2$.

10. The method according to claim 1, wherein the UV-curable lacquer layer is finally cured via at least one mercury vapour medium-pressure lamp or at least one UV-C lamp, the final curing being carried out using a UV radiation dose in the range from 500 to 3,000 mJ/cm$^2$.

11. The method according to claim 1, wherein the photo initiator of the UV-curable lacquer absorbs light with a wavelength in the range from 360 to 420 nm.

12. The method according to claim 1, wherein an embossing roller is used to form the embossed structure, the composite formed from the web like carrier material, the adhesion promoter layer and the lacquer layer being guided around the embossing roller with a wrap angle in the range from 60° to 200°.

13. The method according to claim 1, wherein the embossable material surface is a resin comprising laminate surface.

\* \* \* \* \*